United States Patent [19] [11] 3,911,004
Hertel et al. [45] Oct. 7, 1975

[54] PRODUCTION OF SUBSTITUTED ALKANES

[75] Inventors: Otto Hertel; Helmut Schlecht, both of Ludwigshafen; Rolf Schneider, Mannheim, all of Germany

[73] Assignee: Badische Anilin- & Soda-Fabrik Aktiengesellschaft, Ludwigshafen (Rhine), Germany

[22] Filed: Mar. 30, 1973

[21] Appl. No.: 346,404

[30] Foreign Application Priority Data
Apr. 12, 1972   Germany............................ 2217530

[52] U.S. Cl. ........ 260/543 R; 204/158 HA; 260/660
[51] Int. Cl.² ................. C07C 143/70; C07C 17/10
[58] Field of Search ...................... 260/543 R, 660; 204/158 HA

[56] References Cited
UNITED STATES PATENTS

| | | | |
|---|---|---|---|
| 2,811,485 | 10/1957 | Evans | 204/158 HA |
| 3,287,376 | 11/1966 | Nowburg | 204/158 HA |
| 3,314,870 | 4/1967 | Borner | 204/158 HA |
| 3,402,114 | 9/1968 | Hutson et al. | 204/158 HA |
| 3,505,418 | 4/1970 | Jubin | 260/660 |
| 3,577,472 | 4/1971 | Jubin et al. | 260/660 |
| 3,584,066 | 6/1971 | Reni et al. | 260/660 |

*Primary Examiner*—Anton H. Sutto
*Assistant Examiner*—Richard D. Kelly
*Attorney, Agent, or Firm*—Johnston, Keil, Thompson & Shurtleff

[57] ABSTRACT

Alkanes bearing chlorine atoms and/or sulfochloride groups as substituents are prepared by the reaction of alkanes with chlorine with or without sulfur dioxide in a specific throughput ratio and in a reactor inclined to the horizontal, the starting materials being passed cocurrent upwardly through the reaction zone. The products are pesticides, plasticizers, solvents and starting materials for the production of the same and also of fat-liquoring agents for leather, detergents, lubricants and synthetic resins.

20 Claims, No Drawings

PRODUCTION OF SUBSTITUTED ALKANES

The invention relates to a process for the production of alkanes bearing chlorine atoms and/or sulfochloride groups as substituents by the reaction of an alkane with chlorine with or without sulfur dioxide in a specific throughput ratio and in a reaction zone which is inclined to the horizontal, the starting materials being passed cocurrent upwardly through the reaction zone.

It is known from Ullmanns Encyklopädie der technischen Chemie, volume 8, page 353 to 356, and volume 16, pages 562 et seq. and from Lindner, "Tenside, Textilhilfsmittel, Waschrohstoffe", 2nd edition, volume 1, pages 708 to 713, that alkanes of more than five carbon atoms (individual paraffins) can be converted into chlorinated alkanes and/or alkanes bearing sulfochloride groups as substituents with chlorine with or without sulfur dioxide using thermal energy with or without light energy. In such reactions all theoretically possible isomers are formed as a rule (loc. cit., volume 8, page 354, second paragraph). In addition to isomers of the same degree of substitution (for example all the isomers of monochloro-n-pentadecane), the isomers of the progressive stages of substitution (for example isomers of dichloro- tri-chloro- and polychloro-n-pentadecane) are formed (overchlorination and/or oversulfochlorination), althouh the whole of the starting paraffin is not reacted (Lindner, loc.cit., pages 710 to 713).

Industrially it is not usually individual alkanes which are chlorinated or sulfochlorinated but mixtures of alkanes (paraffins) in the form of paraffin waxes, cracking residues, oil-containing mixtures of solid paraffins in lubricating oil fractions (slack wax), or crude oil fractions, for example of the boiling range from 250° to 350°C, hydrocarbons of the Fischer-Tropsch synthesis, for example of the boiling range 195° to 330°C, or low molecular weight polyolefins. In such reactions there are therefore formed, especially in the prior art continuous methods (Lindner, loc. cit., pages 710 to 713), large amounts of compounds which bear an excess of chlorine atoms or sulfochloride groups having regard to the molar ratio of the reactants (polysubstituted compounds) whereas a corresponding proportion of paraffin remains unreacted. The proportion of unreacted and polysubstituted praffin may amount for example in continuous methods to up to 70% by weight based on the total amount of starting paraffin in the reaction mixture.

Such mixtures are disadvantageous particuarly because of their content of unreacted paraffin. This content promotes turbidity in the liquid substituted paraffin, separates out in the course of time and interferes with the use of these praffins and their derivatives. The polysubstituted paraffins may also interfere with later use, although to a lesser extent. For example the plasticizing effect, washing effect and wetting effect of textile auxiliaries, the lubricating action of synthetic lubricating oils and the emulsifying action of emulsifiers based on such chloroparaffins are decreased in this way and the quality of textile materials treated with such auxiliaries is impaired. The use of such products as fat-liquoring agents for leather is similarly impaired. Where a mixture of isomers of a specific degree of substitution is required, for example a mixture of monochloroalkanes, the separation, for example by distillation, is more difficult the higher the proportion of the other components of the reaction mixture is.

It is true that attempts have been made by raising the temperature or shortening the reaction period to prepare uniformly substituted paraffins, but all these methods have been unsatisfactory in the yield of homogeneous end material and on the other hand additional difficulties may occur, for example dechlorination, dehydrochlorination, cracking, carbonizatin, explosive reaction or deposition of carbon depending on the method (Ullmann, loc.cit., volume 8, pages 354 to 355 and volume 5, pages 438 et seq.)

An improved method in which the reaction is carried out in stages in a plurality of reaction vessels is unsatisfactory because it is not simple to operate and uneconomical. Chlorination with an excess of paraffin in relation to chlorine (partial chlorination) does give a smaller proportion of polysubstituted compounds but there is a higher proportion of unreacted paraffin which interferes to an even greater extent with the further processing of the end mixture for the reasons given above.

It is an object of this invention to provide a novel process for the production by a simpler and more economical method of chlorinated and/or sulfochlorinated alkanes having a number of substituents corresponding to the molar ratio of the starting materials in better space-time yields.

We have found that alkanes of more than five carbon atoms bearing chlorine atoms and/or sulfochloride groups as substituents and having a number of substituents on the alkane molecule equivalent to the molar ratio of the starting materials are obtained more advantageously by reaction of an alkane with chlorine or with chlorine and sulfur dioxide by passing the alkane with a throughput of 0.1 to 30 kilograms and chlorine or chlorine and sulfur dioxide with a throuhput of 0.1 to 20 kilograms per hour per liter of reaction space and at a velocity of the gas layer of 2 to 30 meters per second and a residence time of the gas layer in the reaction zone of 2 to 60 seconds upwardly through a reaction zone whose longitudinal axis forms an angle of from 1.5° to 70° with the horizontal.

When tetradecane is used, the reaction may be represented by the following equations:

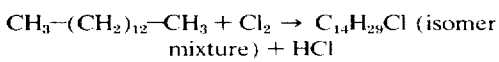
$$CH_3-(CH_2)_{12}-CH_3 + Cl_2 \rightarrow C_{14}H_{29}Cl \text{ (isomer mixture)} + HCl$$

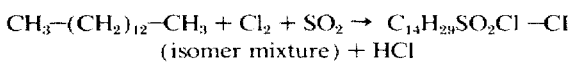
$$CH_3-(CH_2)_{12}-CH_3 + Cl_2 + SO_2 \rightarrow C_{14}H_{29}SO_2Cl -Cl \text{ (isomer mixture)} + HCl$$

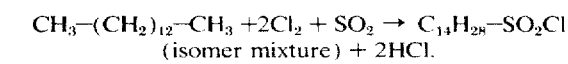
$$CH_3-(CH_2)_{12}-CH_3 + 2Cl_2 + SO_2 \rightarrow C_{14}H_{28}-SO_2Cl \text{ (isomer mixture)} + 2HCl.$$

As compared with prior art methods the process of the invention surprisingly gives in a simpler and more economical manner chlorinated and/or sulfochlorinated alkanes with a number of substituents equivalent to the molar ratio of the starting materials in better space-time yields. The proportion of unreacted alkane and of overchlorinated and/or oversulfochlorinated compounds is less. There are no discolorations. All the above-mentioned difficulties of further processing and the use of the end products or derivatives and of goods treated therewith are substantially decreased. Other advantages of the process of the invention are a more uniform reaction temperature and considerably shorter reaction periods. Moreover there is good transfer of heat from the reaction mixture to the tube wall and this is of importance for simple and economical withdrawal of the heat of reaction, particularly at high throughputs.

When, unlike the process of the invention, the reactants are charged downwardly through a reaction tube, mixing with the liquid is less, the gaseous reactants reacting irregularly with the liquid. When the reactants are passed upwardly throuh a vertical tube, satisfactory mixing is obtained but a very high gas velocity is necessary to move the liquid upward. Since the gas has to remain in the tube for a minimum residence time for its complete reaction, a very great length of tube is necessary. If tower pakcing is used in the tube to distribute the liquid, high conversions are obtained for short distances but in carrying out the chlorination or sulfochlorination on an industrial scale it is impossible to remove the heat of reaction occurring in a fairly small space in such a way that uniform temperature is maintained in the liquid and the abovementioned difficulties are avoided.

The starting alkanes used are preferably those of ten to thirty, advantageously fourteen to twenty-four and particularly nineteen to twenty-three carbon atoms. They may be branched or linear and may be used singly or advantageously as mixtures of alkanes. Example of suitable alkanes are n-dodecane, n-tridecane, n-tetradecane, n-pentadecane, n-hexadecane, n-heptadecane, n-octadecane, n-nonadecane, n-eicosane, n-nonane, 2,2,3,3-tetra-methylbutane, 2,2,4-trimethylpentane and n-tricontane. For reasons of economy the paraffins set out in the discussion of prior art are generally used, the number of carbon atoms then depending on the paraffin used; thus petroleum fractions used for sulfochlorination are preferably mixtures of alkanes having different numbers of carbon atoms and isomerism with an average of from 14 to 18 carbon atoms per molecule.

The starting materials may be used in stoichiometric proportions, for example 4 moles of chlorine and 1 mole of sulfur dioxide per mole of alkane for the production of trichloroalkanemonosulfochlorides. In the case of alkane mixtures like the said paraffins the stoichiometric amounts relate to the mole of alkane having the average number of carbon atoms established for the alkane in question. For the production of disubstituted, trisubstituted and more highly substituted alkanes and paraffins it is preferred to use an excess of chlorine and if desired of sulfur dioxide with respect to the alkane or paraffin; amounts of more than the stoichiometric amount and up to 130% by weight, advantageously from 105 to 120% by weight, of chlorine and if desired amounts of up to 200% by weight and advantageously of from 110 to 170% by weight of sulfur dioxide are suitable based on 1 mole of alkane or paraffin. In the case of alkane mixtures or paraffins the calculation is based on the mean molecular weight. In the production of monosubstituted compounds a deficiency of chlorine (partial chlorination) and if desired of sulfur dioxide is advantageously used; suitable amounts are from less than the stoichiometric amount down to 10% by weight, advantageously from 20 to 50% by weight, of chlorine.

In sulfochlorinations the end products or mixtures of end products contain a small fraction of chlorine substituents in practically all cases. There are thus formed, in addition to pure alkane sulfochlorides, also chloroalkane sulfochlorides and chloroalkanes in an appropriate mixture of isomers. If it is desired to keep this fraction of chloro substituents low, one of the said deficiencies of chlorine is chosen and advantageously a ratio of from 0.5 to 0.9, preferably from 0.6 to 0.8, mole of chlorine per mole of sulfur dioxide.

The process of the invention is based on the observation that the substances to be reacted have to be introduced into the lower end of a tube rising in relation to the horizontal and the gas velocity has to be sufficiently high for the gas to force the liquid upwardly, the liquid flowing upward in a thin layer. It is found that in this process the liquid, which has a tendency to flow backward, is given an undulatin, rolling upward movement by the gas flowing over it and is mixed well without any harmful backmixing taking place. The liquid moving upwardly comes into uniform contact with the gas and a uniform temperature is set up therein. The liquid consists at the start of the liquid alkane (or in the case of a solid alkane, the alkane melt) and is converted during its flow through the tube to an increasing extent into the end substance or end mixture. It is preferred to use throughputs of from 0.1 to 20 kilograms of alkane and of from 0.1 to 5 kilograms of chlorine or of chlorine and sulfur dioxide per hour per liter of reaction space and velocities of the gas layer of from 3 to 10 meters per second. Residence times of from 2 to 30 seconds for the gas layer and of from 3 minutes of 15 minutes for the liquid layer of reaction mixture are preferred.

The reaction is generally carried out at a temperature of from 20° to 160°C at atmospheric or superatmospheric pressure, conveniently at a gas pressure of from 1 to 4, preferably from 1.2 to 2.5, atmospheres batchwise or, preferably, continuously. Reaction temperatures of from 60° to 160°C are preferred in the case of chlorinations, from 20° to 40°C in the case of sulfochlorinations and from 60° to 120°C, particularly from 70° to 100°C, in the case of simultaneous chlorination and sulfochlorination. Organic solvents such as chlorohydrocarbons, for example carbon tetrachloride, tetrachloroethylene, tetrachloroethane and appropriate mixtures thereof which are inert under the reaction conditions may be used if desired; amounts of from 5 to 70% by weight of solvent based on alkane or paraffin are suitable.

Tubes having a length of from 10 to 100 meters and preferably of from 20 to 90 meters and a width of from 0.01 to 0.10 and preferably of from 0.015 to 0.08 meter may conveniently be chosen for the reaction zone. The reaction zone is at an anle of from 1.5° to 70°, preferably of from 2° to 30° between the longitudinal axis thereof and the horizontal. The reaction zone is advantageously formed from tubes in the shape of a spiral. The total reaction zone may also consist of separate consecutive reaction zones, conveniently in the form of tubes, and all or some of the longitudinal axes of the individual zones (tubes may form an angle with the horizontal which is in accordance with the invention, the said angles being identical or different. Some of the zones (tubes) may also be horizontal or inclined to the horizontal at an angle less than 1.5° or more than 70°. The longitudinal axis of the whole zone in all these cases corresponds to the line joining the midpoints of the cross-section at the entrance and at the outlet of the whole reaction zone, for example in the case of a complete tube constructed of straight tubes joined toether by bends after the nature of a spiral staircase. The heat of reaction may be removed by external cooling of the tube system with water, for example by means of jacketed tubes. Cooling may also be effected advantageously by means of a tube arranged concentrically within the reaction tube and through which coolant is passed. This inner tube need not be permeable to light as perhaps an external cooling tube might have to be and may therefore consist of metallic material so that the cooling problem is simplified because of the better rate of heat transfer of metals than that of glass. Mixing and reaction of the gas and liquid are moreover promoted by installing a concentric tube inside the reaction tube.

The reaction may be carried out with exposure to light and all light sources emitting light in the visible range may be used to produce the light. Exposure may be effected for example with sunlight or artificial light, for example from quartz burners, mercury vapor lamps, daylight lamps, or fluorescent tubes. Submered lamps may also be used around which the reaction mixture flows. Light sources are preferred which emit a high proportion of radiation in the wavelength range from 300 to 5000 A units.

The reaction may be carried out as follows: The starting materials are passed upwardly through a reaction zone inclined to the horizontal at the reaction temperature, the reaction pressure and the specified throughputs. The liquid reaction mixture leaving the reaction zone is advantageously passed together with the as downwardly through a packed tower cocurrent in order that any remaining traces of starting material, for example chlorine, in the gas may be caused to react. In the case of an individual alkane the end product is separated from the reaction mixture by a conventional method, for example by fractional distillation. In most cases, especially in industrial operation, the starting material is a mixture of alkanes and the end product is therefore also a mixture which may be purified by distillation but is generally used as it is for further processing, for example hydrolysis.

Substituted alkanes or paraffins prepared by the process of the invention are pesticides, plasticizers, solvents and valuable starting materials for the production of such substances and also of fat-liquoring agents for leather, detergents, lubricating oils, synthetic resins and lubricants. The abovementioned publications and Ullmanns Encyklopädie der technischen Chemie, volume 5, pages 435, 437 and 448 may be referred to for details of use.

The following Examples illustrate the invention. The parts given in the Examples are parts by weight.

EXAMPLE 1

The following slack wax is used:

| Number of carbon atoms | Proportion in % by weight based on total paraffin | |
|---|---|---|
| 12–15 | 0.3 | |
| 16 | 0.2 | Mean chain length $C_{21.2}H_{44.4}$ |
| 17 | 1.1 | |
| 18 | 4.1 | Mean molecular weight: 299 |
| 19 | 11.2 | |
| 20 | 16.2 | Melting point: +41°C |
| 21 | 19.2 | |
| 22 | 17.4 | Density at 45°C: 0.765. |
| 23 | 14.1 | |

-Continued

| Number of carbon atoms | Proportion in % by weight based on total paraffin |
|---|---|
| 24 | 8.9 |
| 25 | 4.5 |
| 26 | 2.2 |
| 27 | 0.6 |

7.65 Parts of slack wax is introduced in liquid form together with 6.41 parts of gaseous chlorine per hour into the lower end of a tube system constructed as follows: 19 straight glass tubes having length of 1 meter and an internal diameter of 15 mm are joined to one another by elbows of the same internal width spirally like a spiral staircase, the upward inclination of each tube being 2°. Each tube is surrounded by a second glass tube (jacket for cooling water) and is exposed to light from a fluorescent tube (4000 to 7000 Angstrom). The gaseous mixture flows through the tube system with a throughput of 1.52 kilograms per hour per liter of reaction space and forces the reaction liquid upwardly in a thin layer. The residence time of the gas in the tube system is 5.5 seconds, and that of the liquid is 6 minutes. The gas velocity if 436 cm/sec. The liquid has a throughput of 1.81 kilograms per hour per liter of reaction space. The reaction mixture is heated up during passage through the tubular reactor by the heat of reaction evolved. The temperature is kept at 100°C. After the liquid and the gas have left the tube system they are passed into the top of a tower packed with Raschig rings and having a length of 1 meter and a diameter of 50 mm. The temperature of the liquid in the uncooled tower rises by 3°C. Liquid and gas are separated in a container located beneath the column.

10.7 parts of chloroparaffin having a chlorine content of 29.6% by weight is obtained per hour. The yield based on the slack wax and on chlorine is practically quantitative in relation to the paraffin substituted in the molar ratio of the starting material and the offgas consists of hydrogen chloride devoid of chlorine. The end mixture is a liquid which is water-white and homogeneously oil at room temperature; it remains clear and liquid when stored.

If the reaction is carried out in known manner by the method described in Lindner, volume 1, page 713, second paragraph, an end mixture is obtained having the same chlorine content from which 10% by weight of unreacted paraffin separates out in solid form. A corresponding portion of polychloroparaffin formed remains in solution.

EXAMPLE 2

23 Parts of the same slack wax as is used in Example 1 is introduced in liquid form together with 18.7 parts of gaseous chlorine and 1.5 parts of sulfur dioxide per hour into the lower end of a tube system of the following design: sixteen straight glass tubes each having a length of 2 meters and an internal diameter of 25 mm are joined to one another by elbows of the same internal diameter to form a kind of spiral staircase, the upward inclination of each tube being 2°. Each tube is surrounded by a second glass tube (for cooling with water) and irradiated externally by a fluorescent tube. The gas which flows through the tube system with a throuhput of 1.08 kilograms per hour per liter of reaction space forces the liquid upward in a thin layer (throughput:

1.24 kilograms per hour per liter of reaction space). The residence time of the gas in the tube system is 8.1 seconds and that of the liquid is 5 minutes.

The heat of reaction liberated (about 7000 Kcal per hour) may be removed without difficulty through the cooling surface of 3 m² which is present. The temperature in the tubular reactor is kept at 80°C. The liquid and gas are passed, after leaving the reactor, as described in Example 1 through a packed tower having a length of 1.5 meters and an internal diameter of 8 cm. Liquid is separated from gas in a container beneath the tower.

33.4 parts of a liquid, water-white sulfo-chlorinated paraffin is obtained per hour with a total chlorine content of 28% by weight. The content of hydrolyzable chlorine is 1.8% by weight. The yield is practically quantitative in relation to the paraffin substituted in the molar ratio of the starting material.

EXAMPLE 3

299 Parts (1 mole) of slack wax is reacted analogously to Example 2 with 220 parts of chlorine (3.1 moles) and 153 parts of sulfur dioxide (2.4 moles) according to the following empirical equation:

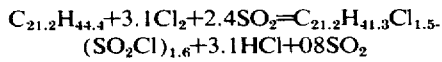

$$C_{21.2}H_{44.4} + 3.1Cl_2 + 2.4SO_2 = C_{21.2}H_{41.3}Cl_{1.5}(SO_2Cl)_{1.6} + 3.1HCl + 0.8SO_2$$

500 Parts of end mixture is obtained. It contains 21.6% by weight of total chlorine and 11.2% by weight of hydrolyzable chlorine. The yield is practically quantitative based on the paraffin substituted in the molar ratio of the starting materials. The end mixture is a water-white liquid which is a homogeneous oily liquid at room temperature; it remains clear and liquid in storae.

EXAMPLE 4

A paraffin of the following composition is used:

| C | % by weight | |
|---|---|---|
| 8 | 0.04 | |
| 9 | 0.02 | |
| 10 | 0.06 | Mean molecular weight: 215.25 |
| 11 | 1.73 | Mean chain length: $C_{15.25}$ |
| 12 | 4.21 | Boiling point: 247.5° to 289.0°C |
| 13 | 7.62 | Density at 20°C: 0.768 |
| 14 | 16.39 | |
| 15 | 25.30 | |
| 16 | 25.86 | |
| 17 | 15.07 | |
| 18 | 2.19 | |
| 19–25 | 1.60 | |

1144 Parts (5.4 moles) of paraffin is reacted analogously to Example 2 with 71 parts (1 mole) of Cl₂ and 77 parts (1.2 moles) of SO₂ according to the emprical equation:

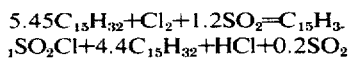

$$5.45C_{15}H_{32} + Cl_2 + 1.2SO_2 = C_{15}H_{31}SO_2Cl + 4.4C_{15}H_{32} + HCl + 0.2SO_2$$

1240 Parts of end mixture of sulfochloride and unreacted n-paraffin is obtained. The yield of sulfochloride is practically quantitative based on the molar ratio of the substituted paraffin starting material and is 310 parts.

This end mixture is hydrolyzed by a conventional method with caustic soda solution and the aqueous phase is separated from the organic phase. The sulfonate formed from the sulfochloride is contained in the aqueous phase. It consists of 96% by weight of monosulfonate and 4% by weight of disulfonate and does not contain any polysulfonate.

When continuous production is carried out by continuously supplying paraffin to a reactor having a circulatory system and withdrawing a corresponding amount of reaction product the proportions of sulfonate after hydrolysis are 68% by weight of monosulfonate, 20% by weight of disulfonate and 12% by weight of polysulfonate.

We claim:

1. A process for chlorination and/or sulfochlorination of alkanes to produce, as reaction products, chloroalkanes, alkane sulfochlorides, and/or chloroalkane sulfochlorides which comprises passing in a liquid phase an alkane having more than five carbon atoms upwardly in the form of a lower, thin layer of the liquid phase through a tubular reaction zone having its longitudinal axis inclined in the range of 2° to 30° relative to the horizontal at a throughput of 0.1 to 20 kilograms of said alkane per hour per liter of reaction space in said reaction zone, and passing chlorine gas or both chlorine gas and sulfur dioxide gas concurrently upwardly through said tubular reaction zone as an upper gas layer at a throughput of said gases in the range of 0.1 to 20 kilograms per hour per liter of reaction space in said reaction zone and at a velocity of said gases in the range of 2 to 30 meters per second, said velocity being sufficient to convey said liquid phase upwardly through the reaction zone with a residence time of said gases in said reaction zone in the range of 2 seconds to 1 minute.

2. A process as claimed in claim 1, said alkane having 14 to 24 carbon atoms.

3. A process as claimed in claim 1 wherein the reaction is carried out with an amount of chlorine which is more than the stoichiometric amount of chlorine and is 105 to 120% by weight of chlorine per mole of alkane, based on the stoichiometric amount of chlorine.

4. A process as claimed in claim 1 wherein the reaction is carried out with an amount of sulfur dioxide which is more than the stoichiometric amount of sulfur dioxide and is 110 to 170% by weight of sulfur dioxide per mole of alkane, based on the stoichiometric amount of chlorine.

5. A process as claimed in claim 1 wherein the reaction products are principally alkane monosulfochlorides obtained by a sulfochlorination reaction using stoichiometric deficiencies of chlorine down to 20–50% by weight of chlorine and a ratio of 0.5 to 0.9 mol of chlorine per mol of sulfur dioxide.

6. A process as claimed in claim 1 wherein the reaction is carried out with a throughput of from 0.1 to 20 kilograms of alkane and from 0.1 to 5 kilograms of chlorine or of chlorine and sulfur dioxide per hour per liter of reaction space and with a gas velocity of the layer of gas of from 3 to 10 meters per second.

7. A process as claimed in claim 1 wherein the reaction is carried out with residence times of from 2 to 30 seconds for the gas layer and from 180 to 900 seconds for the liquid layer of the reaction mixture.

8. A process as claimed in claim 1 wherein the reaction is carried out at a temperature of from 20° to 160°C.

9. A process as claimed in claim 1 wherein the reaction is a chlorination reaction carried out at a temperature of from 20° to 40°C.

10. A process as claimed in claim 1 wherein the reaction is a sulfochlorination carried out at a temperature of from 20° to 40°C.

11. A process as claimed in claim 1 wherein the reaction is a simultaneous chlorination and sulfochlorination carried out at a temperature of from 60° to 120°C.

12. A process as claimed in claim 1 carried out at a gas pressure of from 1 to 4 atmospheres.

13. A process as claimed in claim 1 wherein the liquid layer includes a liquid organic solvent which is inert under the reaction conditions in an amount of from 5 to 70% by weight based on the alkane.

14. A process as claimed in claim 1 wherein the reaction zone is of tubular construction having a length of from 10 to 100 meters and an internal diameter of from 0.01 to 0.10 meter.

15. A process as claimed in claim 1 wherein the reaction products are principally monochloroalkanes obtained by a chlorination reaction using stoichiometric deficiencies of chlorine down to 20–50% by weight of chlorine.

16. A process as claimed in claim 14 wherein said reaction zone consists of a series of straight tubes respectively inclined at 2° to 30° relative to the horizontal and joined by bends or elbows between the straight tubes.

17. A process as claimed in claim 1 wherein the reaction products are principally monochloroalkanes obtained by a chlorination reaction using less than the stoichiometric amount of chlorine down to 10% by weight of said stoichiometric amount.

18. A process as claimed in claim 17 wherein the amount of chlorine used is 20–50% by weight of the stoichiometric amount.

19. A process as claimed in claim 1 wherein the reaction products are principally alkane monosulfochlorides obtained by a sulfochlorination reaction using less than the stoichiometric amount of chlorine down to 10% by weight of said stoichiometric amount.

20. A process as claimed in claim 19 wherein the amount of chlorine used is 20–50% by weight of the stoichiometric amount thereof.

* * * * *

UNITED STATES PATENT AND TRADEMARK OFFICE
CERTIFICATE OF CORRECTION

PATENT NO. : 3,911,004
DATED : October 7, 1975
INVENTOR(S) : HERTEL et al

It is certified that error appears in the above-identified patent and that said Letters Patent are hereby corrected as shown below:

In Column 4, Line 48, delete " anle " and substitute --angle--

In Column 5, Line 17, delete " Submered" and substitute -- Submerged --

In Column 5, Line 27, delete " as " and substiute -- gas --

In Column 7, Line 34, delete " storae " and substitute -- storage --

In Column 8, Line 23, delete " 0.1 to 20 " and substitute -- 0.1 to 30 ---

In Column 8, Line 26, delete "concurrently" and substitute -- cocurrently --

Signed and Sealed this

Fifth Day of October 1976

[SEAL]

*Attest:*

RUTH C. MASON
*Attesting Officer*

C. MARSHALL DANN
*Commissioner of Patents and Trademarks*